United States Patent [19]

Yamamoto et al.

[11] 4,383,057

[45] May 10, 1983

[54] PROCESS OF PREPARING COATING COMPOSITIONS COMPRISING POLYVINYL BUTYRAL AND COLLOIDAL SILICA

[75] Inventors: Tamechika Yamamoto, Zushi; Sumio Saitoh, Yokohama; Hikoji Yoshimura, Yokohama; Masaru Yoshimura, Yokohama, all of Japan

[73] Assignee: Catalysts & Chemicals Ind. Co., Ltd., Tokyo, Japan

[21] Appl. No.: 296,729

[22] Filed: Aug. 27, 1981

Related U.S. Application Data

[63] Continuation of Ser. No. 147,673, May 7, 1980, abandoned.

[30] Foreign Application Priority Data

May 15, 1979 [JP] Japan ................................. 54-59396

[51] Int. Cl.³ .......................... C08K 3/36; C08K 5/05
[52] U.S. Cl. .................................... 523/333; 523/334; 524/379; 524/389; 524/391; 524/493; 524/503; 524/557
[58] Field of Search ................. 523/333, 334; 524/379, 524/389, 391, 503, 557, 493

[56] References Cited

U.S. PATENT DOCUMENTS 3,476,827 11/1969 Engelhardt ..................... 260/33.4 R
3,652,379  3/1972 White et al. ......................... 524/503
4,322,468  3/1982 Raghaua ............................... 525/58

FOREIGN PATENT DOCUMENTS 1478474  6/1977 United Kingdom .

OTHER PUBLICATIONS

Derwent Abst. 74578D/41, ASAHI Glass, (J56106969), (Aug. 1981).
Derwent Abst. 47368D/26, Sadomskii, (SU-770641), (Oct. 1980).
Derwent Abst. 27832W/17, (DT244651), Van Grinten Equiv., (G.B. 1478474), Apr. 1975.

*Primary Examiner*—John C. Bleutge
*Assistant Examiner*—Herbert J. Lilling
*Attorney, Agent, or Firm*—Flynn, Thiel, Boutell & Tanis

[57] ABSTRACT

A coating composition comprising a mixture of an organic solvent solution of polyvinyl butyral and an alcoholic dispersion of substantially spherical colloidal silica. The solid content in said mixture is consisted of 20 to 95% by weight of polyvinyl butyral and 80 to 5% by weight of silica.

1 Claim, No Drawings

PROCESS OF PREPARING COATING COMPOSITIONS COMPRISING POLYVINYL BUTYRAL AND COLLOIDAL SILICA

This is a continuation, of application Ser. No. 147,673 filed May 7, 1980 now abandoned.

BACKGROUND OF THE INVENTION

The present invention relates to a coating composition containing polyvinyl butyral, in particular a coating composition which has especially superior properties such as scratch resistance and chemical resistance and additionally is capable of forming a transparent film rich in flame retarding property.

Polyvinyl butyral (which will be referred to as butyral resin hereinafter), prepared by the steps of saponifying polyvinyl acetate with alkali to obtain polyvinyl alcohol and then subjecting the resulting polyvinyl alcohol to acetalation with butyraldehyde or by performing said saponification and acetalation at the same time, has hitherto been utilized in adhesives, paints and the like and has been widely used in intermediate films for safety glasses as well. However, in view of the fact that said butyral resin, when utilized as coating agent for the purpose of protecting the surface of a substrate, has proved to be defective in that the resulting film is insufficient not only in scratch resistance but also in chemical resistance and inflammability, the application of butyral resin to coating agents has been extremely limited.

The present invention intends to provide a novel coating composition which has successfully eliminated the aforesaid drawbacks, pointed out as being inherent in butyral resin, by the use of colloidal silica. The coating composition according to the present invention is capable of forming on the surface of a substrate a transparent film possessing characteristics such as scratch resistance, chemical resistance an flame retarding property, and therefore it can broaden the utilization of butyral resin as a coating agent.

SUMMARY OF THE INVENTION

The coating composition according to the present invention is composed of a mixture of an organic solvent solution of butyral resin, namely polyvinyl butyral, and an alcoholic dispersion of substantially spherical colloidal silica. The solid content in the mixture is consisted of 20 to 95% by weight of butyral resin and 80 to 5% by weight of silica. The alcoholic dispersion of substantially spherical colloidal silica can be prepared through the steps of effecting neutralization and hydrolysis of a diluted aqueous solution of alkali silicate with acid under alkaline conditions to thereby obtain an aqueous dispersion of fine colloidal silica, then concentrating the resulting aqueous dispersion under alkaline conditions in accordance with the so-called buildup method to thereby obtain an aqueous dispersion of collodial silica and thereafter replacing said dispersive medium in the usual manner by an alcohol.

DETAILED DESCRIPTION

The butyral resin, as mentioned above, is prepared by saponifying polyvinyl acetate with alkali and then subjecting the same to acetalation with butyraldehyde, and is generally considered to be a copolymer of vinyl butyral, vinyl acetate and vinyl alcohol.

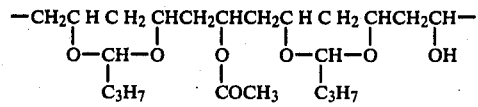

This copolymer commonly contains about 57 to 70 mol% of vinyl butyral and about 25 to 40 mol% of vinyl alcohol. The butyral resin is generally obtained in the form of a white powder and it is well soluble in not only organic solvents such as alcohols, esters and so forth, but also mixed solvents such as ethanol/toluene, isopropanol/xylene, butanol/solvent naphtha and so forth. Accordingly, the above mentioned various organic solvents may be used as solvents for butyral resin, but, when taking into consideration the admixture with an alcoholic dispersion of colloidal silica, which will be referred to afterwards, it is preferable for the present invention to select organic solvents compatible with alcohol as those for use in butyral resin. The concentration of butyral resin in the organic solvent solution may be selected at will, but it is generally preferable to use a solution having a concentration ranging from 10 to 20 wt% in the preparation of the coating composition according to the present invention.

The alcoholic dispersion of colloidal silica to be mixed with the aforesaid organic solvent solution of butyral resin is prepared by first obtaining an aqueous dispersion of spherical colloidal silica particles which are regular in diameter and then replacing the dispersive medium, namely, water, by alcohol. In other words, the aqueous dispersion of substantially spherical colloidal silica particles which are regular in diameter can be obtained by neutralizing and hydrolyzing a diluted aqueous solution of alkali silicate, typically sodium silicate, with acid, typically sulfuric acid, under alkaline conditions thereby to produce fine colloidal silica in the solution, then concentrating this solution under alkaline conditions for allowing the colloidal particles present in the solution to grow into those having a mean particle diameter in the range of about 5 to 100 mμ, and thereafter preventing the thus grown colloidal particles from undergoing gelation by employing a means of controlling the pH of the solution or so. The method for preparing the aqueous dispersion of this sort is taught in U.S. Pat. Nos. 2,574,902 and 2,601,235.

In the case of colloidal silica particles obtained by allowing fine particles to grow, generally speaking, it is common that the surface area of the particle calculated from the mean particle diameter measured by means of a measuring apparatus, such as an electron microscope or the like, is in accord with the surface area of the same calculated by the BET method. In other words, this means that the colloidal silica particle obtained by allowing a fine particle to grow is made into a substantially pure polysilicic spherical body which scarcely contains alkali metal ion, water, hydroxyl group and so forth therewithin. In the case of the silica colloid obtained by the gel deflocculation method, contrarily, it is observed that colloid particles aggregate with each other and disperse in the medium in a flocculent state, which is identical with the silica colloid obtained by hydrolysis of ester silicate. The flocculent silica colloid, in which remarkable variations in contractibility take place when it is dried, are not suitable for compounding with the coating composition. The silica colloid suitably used in the present invention can be precisely differentiated from the said flocculent silica colloid in the point that the former particle is of a high density and a reduced specific surface area. In this connection, it is to be noted that the aforesaid properties relating to the particle density and specific surface area bring about good results on the coating composition.

By adding a proper quantity of alcohol to an aqueous solution of colloidal silica substantially comprising polysilicic spherical bodies and removing the water by the use of distillation or other suitable means therefrom, there can be obtained an alcoholic dispersion of silica colloid. The alcohols suitably added to the aforesaid aqueous dispersion include lower alcohols such as methanol, ethanol, propanol, isopropanol, butanol and the like. Accordingly, it may generally be said that the alcoholic dispersion of silica colloid referred to in the present invention normally employs lower alcohols or their mixtures as the dispersive medium. However, it is to be noted that this alcoholic dispersion may beforehand contain other organic solvents which are compatible with the alcohols used. The silica concentration in the alcoholic dispersion may be selected at will, as in the case of the organic solvent solution, but it is generally preferable for the purpose of compounding the coating composition of the present invention that the silica concentration should be in the range of from 5 to 30 wt%.

However, in view of the fact that the colloidal silica according to the present invention takes the form of substantially spherical particles which are regular in diameter, for instance, when isopropanol is employed as the dispersive medium, even if the silica concentration is elevated up to 60 wt%, it may be possible to maintain the viscosity of the solution to be still below 50 c.p.

The coating composition according to the present invention is prepared, as mentioned above, by mixing the organic solvent solution of butyral resin with the alcoholic dispersion of silica colloid. And, it is preferable that the quantity of butyral resin should be in the range of 20 to 95 wt% of the solid content in the mixture and the quantity of silica should be in the range of 80 to 5 wt% of the same. This is because if the quantity of butyral resin is too small, the film forming ability of the composition will is deteriorated and if the quantity of silica be too small, on the other hand, the film will fail to possess scratch resistance, chemical resistance and flame retarding property respectively in a sufficient degree. The coating composition according to the present invention may be further compounded with a crosslinking agent, and the hardness of the coating film is thereby improved still more. The quantity of the crosslinking agent to be compounded suitably is in the range of 5 to 30 wt% or so. And, it is preferable that alkyl etherificated methylol melamine should be employed as the crosslinking agent.

Next, the constitution and effect of the present invention will be explained more concretely with reference to embodiments given below.

EXAMPLE 1

By mixing an isopropyl alcoholic dispersion of silica colloid having a mean particle diameter of 120 A and a specific surface area of 230 $m^2/g$ (the silica content: 30 wt%) with an isopropyl alcoholic solution of butyral resin (S-Lec BM-1 manufactured by Sekisui Chemical Co., Ltd.) there were prepared coating compositions in which the ratio of the resin content to the silica content in the mixture is different from each other. The respective compositions thus obtained were applied onto glass plates and dried for obtaining films. A comparative study was made of the resulting films in respect of physical properties. The obtained results are as shown in the following Table-1. In this connection, it is to be noted that both the silica content and the resin content refer to their contents, based on the solid content present in the coating composition.

TABLE 1

| | | | | Coating material composition | | | |
|---|---|---|---|---|---|---|---|
| No. | Silica content wt % | Resin content wt % | State | Adhesiveness[1] | Water resisting[2] property | Hardness[3] | Inflammability[4] |
| 1 | 0 | 100 | colorless transparent | No peeling off observed | Normal | 2H | Inflammable |
| 2 | 10 | 90 | colorless transparent | No peeling off observed | " | 3H | Slightly inflammable, carbonized |
| 3 | 20 | 80 | colorless transparent | No peeling off observed | " | 3H | Slightly inflammable, carbonized |
| 4 | 40 | 60 | colorless transparent | No peeling off observed | " | 4H | Noninflammable, carbonized |
| 5 | 50 | 50 | colorless transparent | No peeling off observed | " | 5H | Noninflammable, carbonized |
| 6 | 67 | 33 | colorless transparent | No peeling off observed | " | 7H | Noninflammable, carbonized |

[1] The film is crosscut, and then peeled off with an adhesive cellophane tape.
[2] Water is dropped onto the film to thereby investigate whether there is any change.
[3] Pencil hardness (Pencil used: "MITSU-BISHI UNI")
[4] The film is exposed to the flame from a Bunsen burner for 1 minute for investigating purposes.

When comparing the film obtained by using the coating composition comprising butyral resin alone (which see No. 1) with those obtained by using the coating compositions comprising the concurrent use of that resin and silica, it can be seen from Table-1 that the hardness of the film is more increased and the inflammability is also more improved with increase of the silica content.

EXAMPLE 2

By using an isopropyl alcoholic dispersion of silica colloid (the silica content: 30 wt%) and an isopropyl alcoholic solution of butyral resin (the resin content: 10 wt%) there were first prepared silica/butyral original solutions in which the ratio of silica to resin is different from each other. The resulting original solutions were added with a crosslinking agent, that is, alkyl etherificated methylol melamine (Super-Beckamine J-820 manufactured by Nihon Reichold Co., Ltd.) and were further added with n-butanol for the purpose of controlling the rate of evaporation, thereby obtaining various kinds of coating compositions. Next, the respective compositions were applied onto 3 mm-thick plates made of polycarbonate (Panlite manufactured by Teijin Limited). The thus obtained films were compared in respect of their physical properties. The results are as shown in Table-2.

It is clearly seen from Table-2 that in case where the quantities of silica contained in films are in the range of 60 to 70 wt% (which see No. 8 and No. 9) there can be obtained coated films having resistance to methylene chloride as well as increased hardness. And, it can be seen from the results of Example 1 and Example 2 that the coating composition according to the present invention can reduce the quantity of high-priced butyral resin used and yet produce films rich in physical properties of the same rank or more in comparison with the film produced by using the coating composition comprising butyral resin alone.

loidal silica particles, which comprises the steps of: preparing an aqueous dispersion of substantially pure, substantially spherical, colloidal silica particles which are of regular diameter in the range of 5 to 100 mμ and which have a high density and a reduced specific surface area by neutralizing and hydrolyzing a dilute aqueous solution of an alkali silicate with an acid, under alkaline conditions, to produce fine colloidal silica particles, then concentrating the solution under alkaline conditions effective to cause the fine colloidal silica particles to grow to form said substantially pure, substantially spherical, colloidal silica particles which have regular diameters in the range of 5 to 10 mμ and which are substantially free of alkali metal ions, hydroxyl groups and water within the particles, and then controlling the pH of the solution to prevent gelation of said substantially spherical colloidal silica particles; then

TABLE 2

| Item | | 7 | 8 | 9 | 10 | 11 | 12 | 13 |
|---|---|---|---|---|---|---|---|---|
| Compound[1] | Silica/butyral original solution | (70) 5 | (70) 5 | (70) 5 | (50) 5 | (50) 5 | (80) 5 | Lexan MR-4000 |
| | J-820 | 0.6 | 0.4 | 0.2 | 0.6 | 0.2 | 0.6 | (manufactured |
| | n-butanol | 1 | 1 | 1 | 1 | 1 | 1 | by GE) |
| Film-forming conditions | | RT. 5 min. plus 120–130° C. 1 hr | The same as left | The same as left | The same as left | The same as left | The same as left | Room temperature-drying |
| Film appearance | | Transparent | The same as left | The same as left | The same as left | The same as left | The same as left | Transparent |
| Chemical[2] resistance | Isopropyl alcohol | Normal | The same as left | The same as left | The same as left | The same as left | | Normal |
| | Toluene | Normal | The same as left | The same as left | The same as left | The same as left | | Normal |
| | Acetone | Normal | The same as left | The same as left | The same as left | The same as left | | Normal |
| | Methylene chloride | Slightly swollen | Normal | The same as left | Swollen | Swollen | | Swollen |
| Boiling water resistance | Sealed with a vinyl chloride primer and thereafter dipped in 100° C. boiling water for 1 hour | Normal | The same as left | Stripped off where exposed to vapour | Normal | The same as left | Stripped off where exposed to vapour | Normal |
| Scratch reisitance ASTM D673 (1 Kg SiC #80) | | Slightly inferior to Lexan MR 4000 | The same as left | The same as left | The same as left | The same as left | The same as left | Blank |
| Pencil Hardness (normal state) | | H | H | H | H | H | H | HB |
| Adhesiveness[3] (normal state) | | 100/100 | 100/100 | 100/100 | 100/100 | 100/100 | 100/100 | 100/100 |

[1]The compound is shown in terms of part by volume. The bracketed numerals relating to the silica/butyral original solution denote the values calculated by the expression: (silica/silica plus butyral resin) × 100.
[2]The chemical resistance was measured in the manner of permeating each chemical solution into an absorbent cotton, pressing it against the surface of a film being tested at room temperature for 5 minutes, and thereafter judging from the external appearance of the film.
[3]The film is crosscut, and then peeled off with an adhesive cellophane tape.

What is claimed is:

1. A process for preparing a coating composition comprising a mixture of (1) an organic solvent solution of polyvinyl butyral resin, and (2) a dispersion, in alcohol, of substantially spherical colloidal silica particles having a mean particle diameter in the range of from about 5 to about 100 mμ, the solids of said composition consisting essentially of from 20 to 95% by weight of said polyvinyl butyral resin and correspondingly from 80 to 5% by weight of said substantially spherical colloidal silica particles, which comprises the steps of: preparing an aqueous dispersion of substantially pure, substantially spherical, colloidal silica particles which are of regular diameter in the range of 5 to 100 mμ and adding a lower alkanol to said aqueous dispersion and removing the water from said aqueous dispersion to obtain an alkanol dispersion consisting essentially of said lower alkanol and from 5 to 30 wt.% of said substantially pure, substantially spherical, colloidal silica particles, and then mixing said alkanol dispersion with an organic solvent solution consisting essentially of an organic solvent which is compatible with said alkanol and from 10 to 20 wt.% of polyvinyl butyral resin.

* * * * *

UNITED STATES PATENT AND TRADEMARK OFFICE
CERTIFICATE OF CORRECTION

PATENT NO. : 4 383 057
DATED : May 10, 1983
INVENTOR(S) : Tamechika Yamamoto et al It is certified that error appears in the above-identified patent and that said Letters Patent is hereby corrected as shown below:

Column 6, line 13; change "10" to ---100---.

Signed and Sealed this

Twentieth Day of September 1983

[SEAL]

Attest:

GERALD J. MOSSINGHOFF

Attesting Officer

Commissioner of Patents and Trademarks